March 6, 1928.
F. J. SPANG
1,661,638
FISHING TOOL
Filed Sept. 6, 1924      2 Sheets-Sheet 2
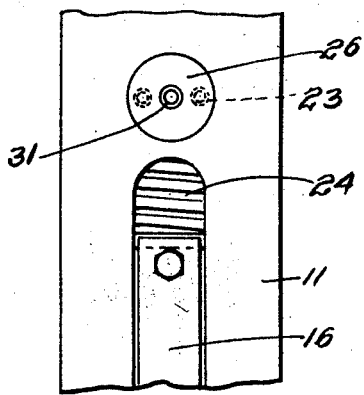
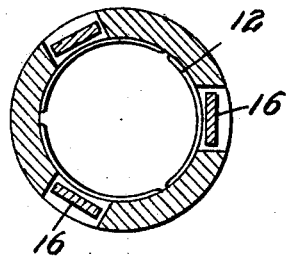
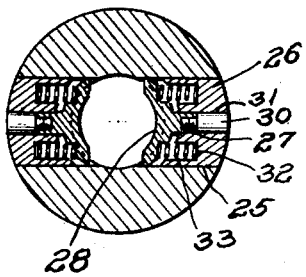
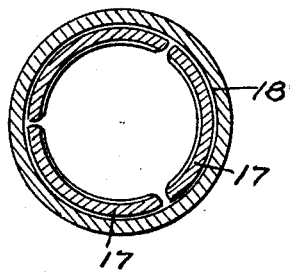
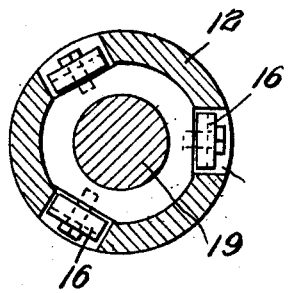
INVENTOR
Ferdinand J. Spang
By Green & McCallister
His Attorneys Patented Mar. 6, 1928.

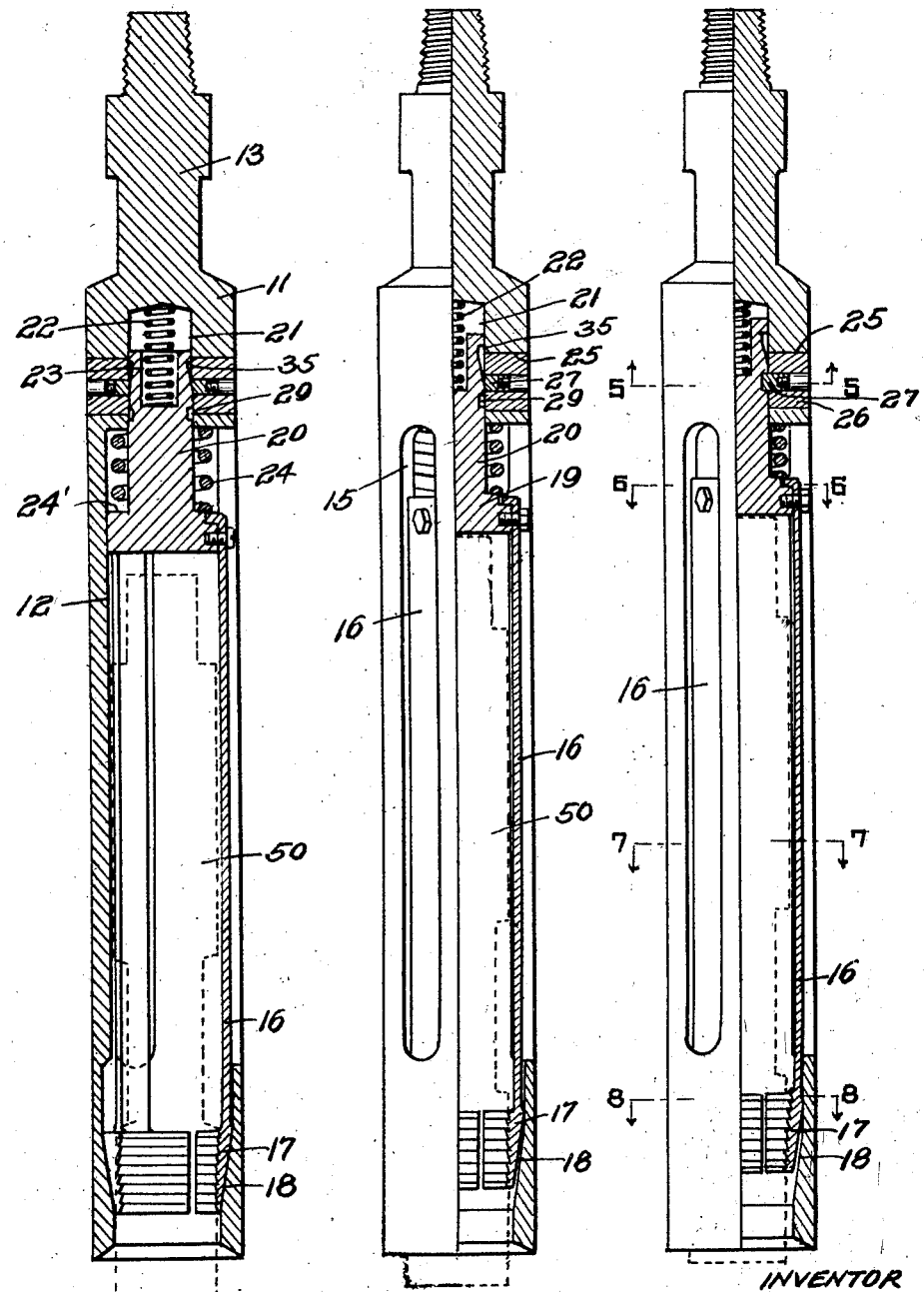

1,661,638

UNITED STATES PATENT OFFICE.

FERDINAND J. SPANG, OF BUTLER, PENNSYLVANIA.

FISHING TOOL.

Application filed September 6, 1924. Serial No. 736,273.

This invention relates to fishing tools such as are used for retrieving lost tools or articles from deep wells and more particularly to that type of fishing tools known as slip sockets or combination sockets.

Heretofore, when a lost tool was gripped or held by means of a slip socket or combination socket and the lost tool could not be loosened in order to raise it, there was no way to release the grip of the socket jaws unless the slips or the socket could be destroyed in order to release the jaws from the tool. Obviously, where the socket and slips were made of rugged material such as could not be wrecked while in the well, the fishing tool could not be loosened and it, together with the equipment attached to it, was lost. Certain devices have been designed for tripping or releasing the jaws of a fishing tool from the article gripped, when the latter has proved immovable, in order that the fishing tool itself may not be lost, but these devices are wholly impractical for the reason that they provide no means for supporting the fishing tool or socket upon the lost article in order to attach the fishing cable to the surface equipment without tripping the jaws. In other words, with the present form of tool, the jaws are tripped by allowing the fishing tool to rest upon the lost article and it is, therefore, impossible to attach the fishing cable to the surface equipment while the fishing tool is resting on the lost article, and at the same time obtain a gripping engagement with the lost article.

An object of this invention is to provide a fishing tool of the type set forth in which the gripping jaws can be tripped or released from the lost article and which has means for supporting itself and the attached equipment on the article without actuating the tripping mechanism.

A further object is to provide a tool of this type which is provided with an improved means for tripping or releasing the lost article if it proves immovable.

A still further object is to provide a tool of the type set forth which will be simple and cheap to manufacture and assemble, positive and reliable in operation and rugged in construction.

These and other objects which will be apparent to those skilled in this particular art are attained by means of this invention, two embodiments of which are shown in the accompanying drawings, in which—

Figure 1 is a longitudinal section through one form of a fishing tool embodying this invention, showing the same lowered over, but not resting on the lost article;

Fig. 2 is a side elevation, partly in longitudinal section of the tool resting on the lost article;

Fig. 3 is a similar view, showing the jaws tripped and raised from their seats;

Fig. 4 is a side elevation of a part of the tool;

Fig. 5 is a transverse section on the line 5—5 of Fig 3;

Fig. 6 is a transverse section on the line 6—6 of Fig. 3;

Fig. 7 is a transverse section on the line 7—7 of Fig. 3;

Fig. 8 is a similar view on the line 8—8 of Fig. 3.

The illustrated embodiments of this invention include a body member which is of hollow cylindrical form for a substantial part of its length, and which has the usual conical bore adjacent one end for co-operating with the slips or jaws to contract the latter into gripping engagement with the lost article. The slips are secured to a slidable member or plug which is associated with the body member and which is adapted to rest upon the lost article and support the body member thereon by means of coil springs interposed between the slidable member and a shoulder of the body member. Relative upward movement of the body member causes the jaws to contract in the well-known manner so as to grip and lift the lost article. The tripping mechanism includes spring pressed catches in the body member which are adapted to engage with notches formed in the slidable plug upon the downward jarring of the body member against the pressure of the coil springs. After tripping all relative movement between the body member and the slidable member is prevented and the jaws are accordingly unable to grip the lost article.

As illustrated in Figs. 1 to 8, the body member 11 is in the form of a cylinder 12 having a solid head 13 provided with the usual wrench surfaces and screw threads for attaching to other equipment. The cylindrical portion 12 is provided with slots 15 in which the slip reins 16 are movable. Each slip rein, herein shown as three in number, has a slip or jaw 17 formed on the lower end thereof and adapted to co-operate with a conical bore 18 formed at the lower end of the cylindrical portion 12 of the tool for contracting the jaws 17 to grip and hold an article upon relative upward movement of the body member and its conical bore. The upper end of each slip rein is secured to a slip support 19 shown as being in the form of a plug having a neck 20 which is slidably received within the reduced bore or socket 21 formed in the upper end of the body member 11. A tightening spring 22 is interposed between the end of the socket 21 and a seat 23 formed therefor in the upper end of the neck 20. A supporting spring 24 is also provided between a spring supporting shoulder 24', formed on the plug 19, and the upper end of the cylindrical bore 12.

Diametrically opposite recesses 25 are provided in the body member 11 on opposite sides of the socket 21 adjacent the neck 20. Securely mounted in each recess is a trip holder 26 in which are mounted the trips or catches 27 which are provided with arcuate faces 28 for engaging notches 29 formed in the neck 20. Each trip or catch has a rearwardly extending internally threaded projection 30 which is slidably received in a bore 31 formed in the trip holder 26, see Fig. 5. The trip holder is also provided with a bore 32 on each side of the bore 31 for receiving coil springs 33 which at their outer ends contact with the trip or catch 27 so as to force the same inwardly against the neck 20 of the slidable plug 19.

An annular shoulder 35 is formed adjacent the top of the neck 20 for engaging the trips 27 to prevent the plug 19 being forced downwardly out of the socket 21.

In operation, it is apparent that the springs 22 and 24, together with the dead weight of the slip-support or plug 19, the slip reins 16 and slips or jaws 17, would force the latter downwardly into the cone-shaped bore 18 so that they are contacted diametrically. When the socket is lowered into the well, the lost article 50 strikes the contracted slips forcing them upwardly as the body 11 with the conical bore continues to move down around the article. As the slips or jaws move inwardly, they are expanded in the conical bore until the article passes between them and contacts with the bottom of the plug 19, see Fig. 1. The dead weight of the socket and the equipment attached to it will still further force the socket body 11 downwardly over the lost object 50 until the spring 24 contracts sufficiently to carry the load, see Fig. 2. At that point the tripping recesses 29 will have traveled toward but not to the trip or catch 27. This provision of means for supporting the socket upon the lost article without tripping permits the fishing cable to be attached to the surface equipment at the proper time. When this is done, the socket can be raised and the tightening spring 22, which has a longer range of action than the shorter, heavier supporting spring 24, supplemented by the dead weight of the slips or jaws force the latter into the cone-shaped bore. The jaws are thus contracted so as to grip and hold the lost article 50.

If it proves to be impossible to raise or remove the lost article, the socket can be tripped so as to release it therefrom by downward jarring. This consists in lifting the auger stem, a part of the equipment attached to the screw threads at the top of the socket, for the length of the stroke of the jars which are attached between the auger stem and the socket, and then dropping it with some violence. The momentum of this weight compresses the load spring 24 allowing the slip support or plug 19 to travel into the socket 21 until the trip 27 engages the recesses 29 and locks the plug 19 against movement, see Fig. 3. In this position, the slips are held away from the conical bore and the socket is free to be raised from the lost article.

If it has been necessary to trip the jaws, they may be released, upon removal from the well, by threading a proper implement into the threaded projection 30 of each trip 27 and retracting them against the pressure of the coil springs 33. This frees the notches 29 of the trips and permits the plug 19 and jaws 17 to snap back into operative position.

It will be obvious to those skilled in this particular art that the trip and tripping recesses may be of any desired form.

While I have described specific forms of this invention, I do not wish to be limited to the particular details hereof but what I claim as new and desire to secure by Letters Patent is:—

1. A fishing tool having in combination a socket member, a reciprocable member mounted therein and provided with gripping jaws extending longitudinally of said socket, means on said socket for contracting said jaws upon relative downward movement of said reciprocable member so as to cause them to grip an external object, means for locking said reciprocable member against movement so as to prevent the operation of said jaws, a relatively short spring associated with said reciprocable member so as to support said socket thereon and normally prevent operation of said locking means and a relatively long spring for moving said jaws downwardly to gripping position when said socket member is raised.

2. A fishing tool having in combination a socket member, a reciprocable plug mounted therein and provided with gripping jaws extending longitudinally of said member, a conical bore on said member adapted to contract said jaws upon relative downward movement thereof so as to cause them to grip an external object, means for yieldingly pressing said plug downwardly so as to contract said jaws, spring actuated means for limiting the downward movemment of said plug and for locking the same against movement in its upper position so as to prevent the operation of said jaws.

In testimony whereof, I have hereunto subscribed my name this fourth day of September, 1924.

FERDINAND J. SPANG.